(12) United States Patent
Oh et al.

(10) Patent No.: US 7,545,732 B2
(45) Date of Patent: Jun. 9, 2009

(54) APPARATUS AND METHOD FOR ASSIGNING SUB-CARRIERS IN AN ORTHOGONAL FREQUENCY DIVISION MULTIPLEX SYSTEM

(75) Inventors: Hyun-Seok Oh, Incheon (KR); Sung-Jin Kim, Suwon-si (KR); Yong-Suk Moon, Suwon-si (KR); Young-Seok Lim, Seoul (KR); Hyun-Seok Yu, Seoul (KR); Gin-Kyu Choi, Seoul (KR); Hye-Jeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1022 days.

(21) Appl. No.: 10/921,149

(22) Filed: Aug. 19, 2004

(65) Prior Publication Data

US 2007/0140102 A1    Jun. 21, 2007

(30) Foreign Application Priority Data

Aug. 22, 2003    (KR) ...................... 10-2003-0058426

(51) Int. Cl.
*H04J 11/00*    (2006.01)

(52) U.S. Cl. ........................ 370/206; 370/208; 370/332; 370/348

(58) Field of Classification Search ......... 370/206–208, 370/252, 281, 295, 332–335, 342, 348; 455/69, 455/434, 435, 455, 463, 422.1, 447–450, 455/452.1, 452.2, 453, 42, 500, 512, 513, 455/102–105; 375/260, 133, 135, 267
See application file for complete search history.

(56) References Cited

U.S. PATENT DOCUMENTS

| 5,726,978 | A  | * | 3/1998  | Frodigh et al. ............... 370/252 |
| 6,131,016 | A  | * | 10/2000 | Greenstein et al. ............ 455/69  |
| 6,904,283 | B2 | * | 6/2005  | Li et al. ...................... 370/208 |
| 2003/0137955 | A1 |   | 7/2003  | Kim et al. .................... 370/332 |
| 2004/0109493 | A1 | * | 6/2004  | Blessent et al. ............. 375/146 |
| 2005/0128993 | A1 | * | 6/2005  | Yu et al. ..................... 370/342 |

FOREIGN PATENT DOCUMENTS

| JP | 11-027231  | 1/1999 |
| JP | 11-205205  | 7/1999 |
| JP | 2000-114846 | 4/2000 |
| JP | 2000-209145 | 7/2000 |

(Continued)

*Primary Examiner*—Ian N Moore
(74) *Attorney, Agent, or Firm*—Roylance, Abrams, Berdo & Goodman, L.L.P.

(57) ABSTRACT

An apparatus and method for assigning sub-carriers in an orthogonal frequency division multiplex (OFDM) system are disclosed. In the apparatus and method, data is transmitted through at least one transmit antenna. At least two sub-carriers in a predetermined frequency band are assigned to a user equipment (UE), for data transmission. A Node B groups sub-carriers available to the OFDM system into sub-carrier groups, each having at least two sub-carriers, transmits data to the UE on sub-carriers in the sub-carrier groups, selects at least one sub-carrier group for the UE based on channel condition information about each of the sub-carrier groups received from the UE, and assigns the selected sub-carrier group to the UE.

9 Claims, 8 Drawing Sheets

FOREIGN PATENT DOCUMENTS

| | | |
|---|---|---|
| JP | 2001-238269 | 8/2001 |
| JP | 2003-152671 | 5/2003 |
| JP | 2003-169036 | 6/2003 |
| JP | 2003-174426 | 6/2003 |
| WO | WO 02/31991 | 4/2002 |
| WO | 2002-49306 | 6/2002 |
| WO | WO 03/021829 | 3/2003 |
| WO | WO 03/058871 | 7/2003 |
| WO | WO 03/084108 | 10/2003 |

* cited by examiner

| FI-1 | FI-2 | ............ | FI-G-1 | FI-G |

FIG.8

APPARATUS AND METHOD FOR ASSIGNING SUB-CARRIERS IN AN ORTHOGONAL FREQUENCY DIVISION MULTIPLEX SYSTEM

PRIORITY

This application claims priority under 35 U.S.C. § 119(a) to an application entitled "Apparatus and Method for Assigning Sub-Carriers in an Orthogonal Frequency Division Multiplex System" filed in the Korean Intellectual Property Office on Aug. 22, 2003 and assigned Serial No. 2003-58426, the entire contents of which are incorporated herein by reference.

BACKGROUND OF THE INVENTION

1. Field of the Invention

The present invention relates generally to an Orthogonal Frequency Division Multiplex OFDM mobile communication system. In particular, the present invention relates to a method and apparatus in a Node B for assigning sub-carriers to a mobile terminal for data transmission/reception.

2. Description of the Related Art

A signal transmitted on a radio channel arrives at a receiver from different paths because of obstacles between a transmitter and the receiver. The characteristics of the multi-path radio channel are defined by the maximum delay spread and signal transmission period of the channel. If the transmission period is longer than the maximum delay spread, no interference is generated between successive signals and the channel is characterized by frequency non-selective fading in a frequency domain. For high-speed transmission in a wide band, however, the transmission period is shorter than the maximum delay spread, causing interference between successive signals. Thus, a received signal undergoes inter-symbol interference (ISI). In this case, the channel is characterized by frequency selective fading in the frequency domain. A single-carrier transmission scheme adopting coherent modulation requires an equalizer to eliminate the ISI. Also, as the data rate increases, distortion caused by the ISI becomes severe, thereby increasing the complexity of the equalizer. As a solution to the equalizer problem in the single-carrier transmission scheme, Orthogonal Frequency Division Multiplex (OFDM) was proposed.

Typically, OFDM is defined as a two-dimensional access technology comprising Time Division Access (TDA) and Frequency Division Access (FDA). Therefore, each OFDM symbol is transmitted on a predetermined sub-channel composed of distributed sub-carriers.

The orthogonal nature of OFDM allows the spectrums of sub-channels to overlap, having a positive effect on spectral efficiency. Since OFDM modulation/demodulation is implemented by Inverse Fast Fourier Transform (IFFT)/Fast Fourier Transform (FFT), a modulator/demodulator can be efficiently realized digitally. Also, the robustness of OFDM against frequency selective fading and narrow band interference makes OFDM effective for high-speed data transmission standards such as IEEE 802.11a, IEEE 802.16a, and IEEE 802.16b for a large-volume radio communication system.

OFDM is a special case of Multi Carrier Modulation (MCM) in which a serial symbol sequence is converted to parallel symbol sequences and modulated to mutually orthogonal sub-carriers (sub-channels) prior to transmission.

The first MCM systems appeared in the late 1950's for military high frequency radio communication, and OFDM with overlapping orthogonal sub-carriers was initially developed in the 1970's. In view of orthogonal modulation between multiple carriers, OFDM has limitations in actual implementation for systems. In 1971, Weinstein, et. al. proposed an OFDM scheme that applies Discrete Fourier Transform (DFT) to parallel data transmission as an efficient modulation/demodulation process, which was a driving force for the development of OFDM. Also, the introduction of a guard interval and a cyclic prefix as the guard interval further mitigates adverse effects of multi-path propagation and delay spread on systems. This is a reason why OFDM has been widely exploited for digital data communications such as digital audio broadcasting (DAB), digital TV broadcasting, wireless local area network (WLAN), and wireless asynchronous transfer mode (W-ATM).

Although hardware complexity was an obstacle to widespread use of OFDM, recent advances in digital signal processing technology including FFT and IFFT enable OFDM to be implemented. OFDM, similar to Frequency Division Multiplexing (FDM), provides optimum transmission efficiency in high-speed data transmission because it transmits data on sub-carriers, maintaining orthogonality among them. The optimum transmission efficiency is further attributed to good frequency use efficiency and robustness against multi-path fading in OFDM. Overlapping frequency spectrums lead to efficient frequency use and robustness against frequency selective fading and multi-path fading. OFDM reduces the effects of the ISI by using guard intervals and enables the provisioning of a simple equalizer hardware structure. Furthermore, since OFDM is robust against impulse noise, it is increasingly popular in communication systems.

Figure 1:
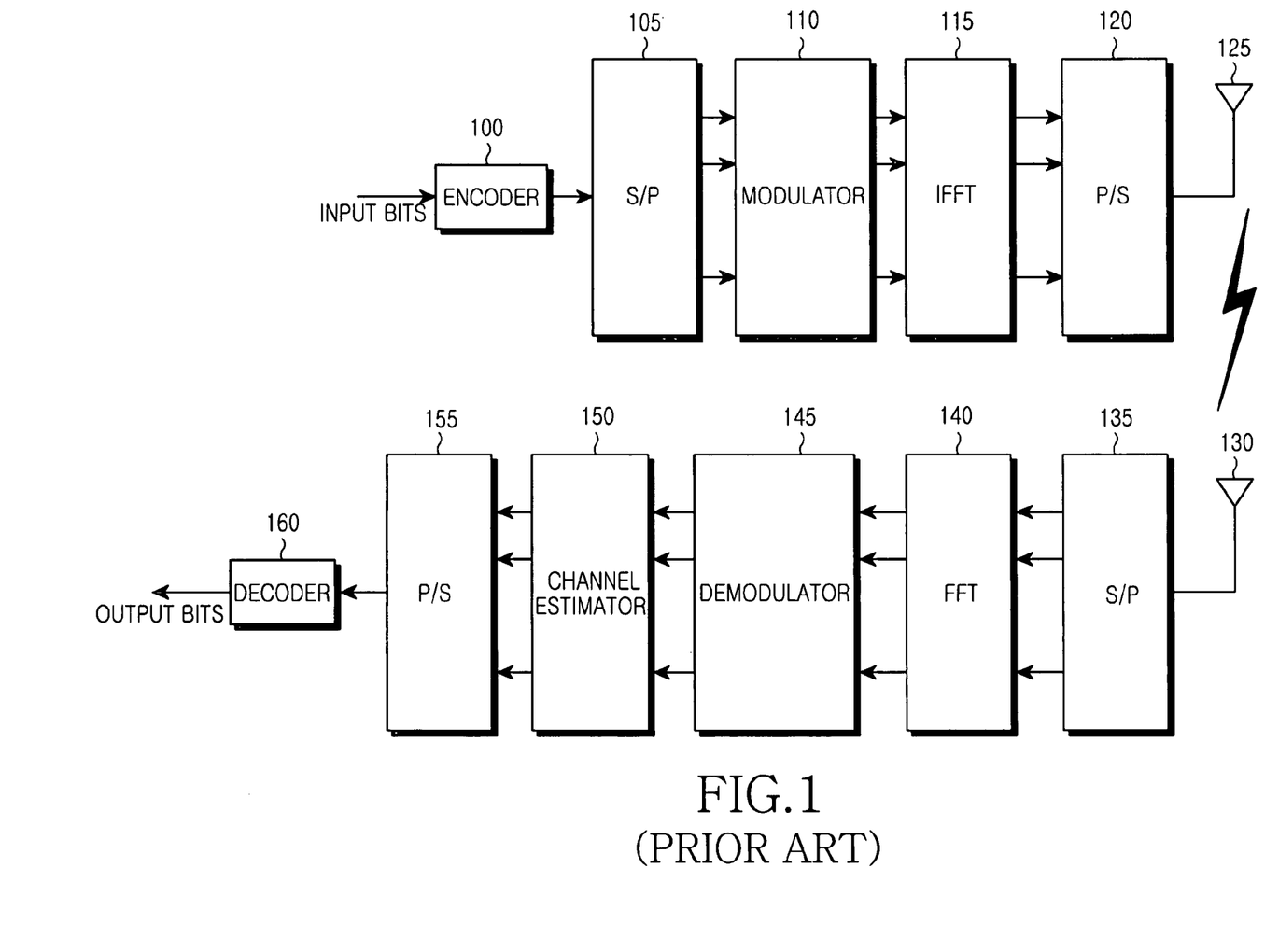
FIG. 1 is a block diagram illustrating a conventional Orthogonal Frequency Division Multiplex (OFDM) mobile communication system.

FIG. 1 is a block diagram of a conventional OFDM mobile communication system. Its structure will be described in detail with reference to FIG. 1.

For the input of bits, a channel encoder 100 outputs code symbols. A serial-to-parallel (S/P) converter 105 converts a serial code symbol sequence received from the channel encoder 100 to parallel symbol sequences. A modulator 110 maps the code symbol to a signal constellation by Quadrature Phase Shift Keying (QPSK), 8-ary Phase Shift Keying (8PSK), 16-ary Quadrature Amplitude Modulation (16QAM), or 64-ary Quadrature Amplitude Modulation (64QAM). The number of bits forming a modulation symbol is preset for each of the modulations: a QPSK modulation symbol has 2 bits, a 8PSK modulation symbol has 3 bits, a 16QAM modulation symbol has 4 bits, and a 64QAM modulation symbol has 6 bits. An IFFT 115 inverse-fast-Fourier-transforms modulation symbols received from the modulator 110. A parallel-to-serial (P/S) converter 120 converts parallel symbols received from the IFFT 115 to a serial symbol sequence. The serial symbols are transmitted through a transmit antenna 125.

A receive antenna 130 receives the symbols from the transmit antenna 125. A serial-to-parallel (S/P) converter 135 converts a received serial symbol sequence to parallel symbols. An FFT 140 fast-Fourier-transforms the parallel symbols. A demodulator 145, having the same signal constellation as used in the modulator 110, demodulates the FFT symbols to binary symbols by the signal constellation. The demodulation depends on the modulation. A channel estimator 150 channel-estimates the demodulated binary symbols. The channel estimation estimates situations involved in transmission of data from the transmit antenna, to thereby enable efficient data transmission. A P/S converter 155 converts the channel-estimated binary symbols to a serial symbol sequence. A decoder 160 decodes the serial binary symbols and outputs decoded binary bits.

Figure 2:
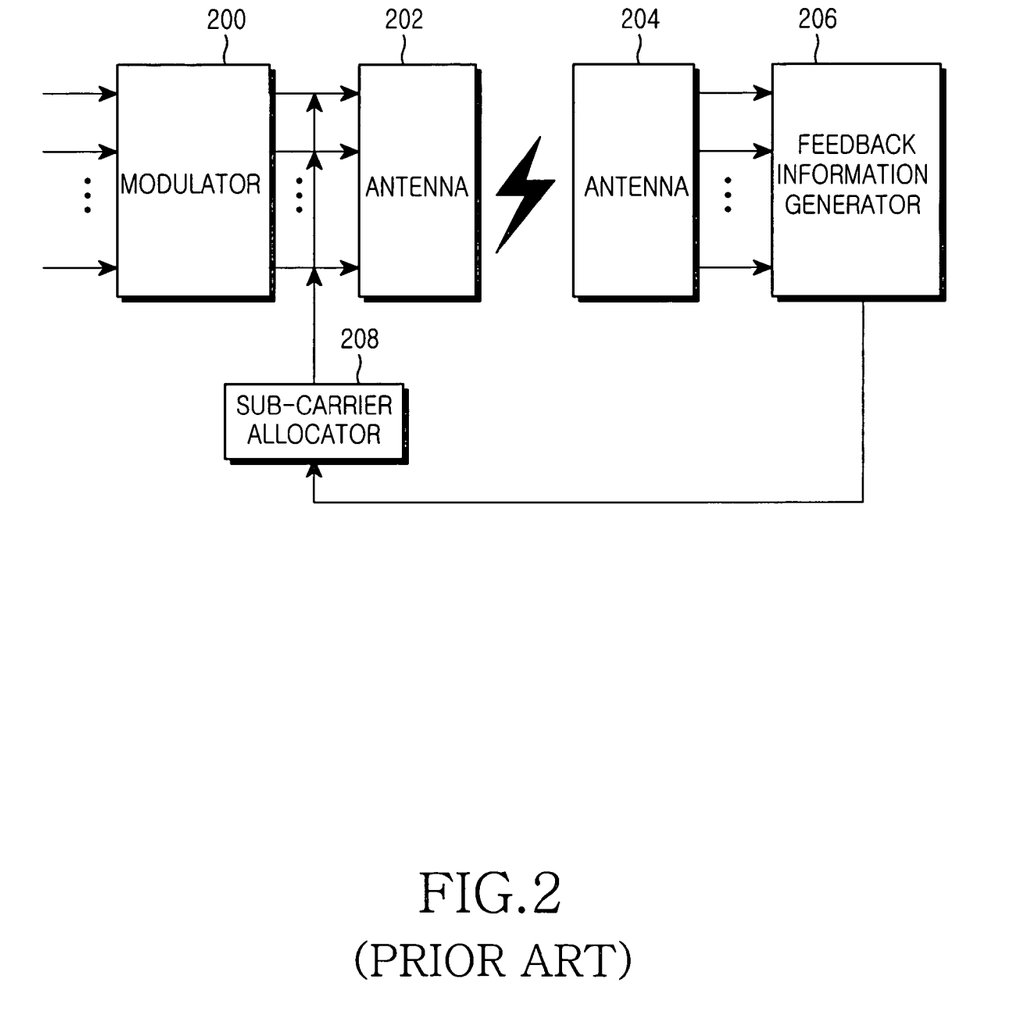
FIG. 2 is a block diagram illustrating a conventional operation for assigning sub-carriers to a user equipment (UE) in a sub-carrier allocator of a Node B in the OFDM mobile communication system of FIG. 1.

FIG. 2 illustrates an operation in a Node B for assigning sub-carriers to a User Equipment (UE) in an OFDM mobile communication system. With reference to FIG. 2, sub-carrier assignment to a UE from a Node B will be described below.

Transmission data is modulated in a modulator 200 and transmitted through an antenna 202. As stated, the modulated data is transmitted on a plurality of sub-carriers. The Node B uses all of the sub-carriers or a selected part of the sub-carriers, for transmission of the modulated data.

A feedback information generator 206 estimates the channel condition of data received through a receive antenna 204. The feedback information generator 206 measures the Signal-to-Interference power Ratio (SIR) or Channel-to-Noise Ratio (CNR) of the received signal. That is, the feedback information generator 206 measures the channel condition of an input signal transmitted on a particular channel (or sub-carrier and transmits the measurement to a sub-carrier allocator 208. Table 1 illustrates an example of feedback information that the feedback information generator 206 transmits to the sub-carrier allocator 208.

TABLE 1

| Sub-carrier | Feedback information |
|---|---|
| Sub-carrier #0 | a |
| Sub-carrier #1 | b |
| Sub-carrier #2 | d |
| Sub-carrier #3 | c |
| Sub-carrier #4 | e |
| Sub-carrier #5 | g |
| Sub-carrier #6 | d |
| Sub-carrier #7 | e |
| ... | ... |
| Sub-carrier #N − 1 | f |

In the case illustrated in Table 1, data is transmitted on N sub-carriers. Feedback information a to g is an SIR or CNR generated from the feedback information generator 206. The sub-carrier allocator 208 determines a sub-carrier on which data is delivered based on the feedback information. The sub-carrier allocator 208 selects a sub-carrier having the highest SIR or CNR. If two or more sub-carriers are used between the Node B and the UE, as many sub-carriers having the highest SIRs or CNRs as required are selected sequentially. If the SIR or CNR is higher in the order of a>b>c>d>e>f>g, the sub-carrier allocator 208 assigns sub-carriers in the order of sub-carrier #0, sub-carrier #1, sub-carrier #3, sub-carrier #2, and so on. If one sub-carrier is needed, sub-carrier #0 is selected. If two sub-carriers are used, sub-carrier #0 and sub-carrier #1 are assigned. If three sub-carriers are used, sub-carrier #0, sub-carrier #1, and sub-carrier #3 are assigned. If four sub-carriers are used, sub-carrier #0, sub-carrier #1, sub-carrier #3 and sub-carrier #2 are assigned.

The above-described sub-carrier assignment is performed in two stages: one is to arrange feedback information according to channel conditions and the other is to assign as many sub-carriers as needed to a UE based on the feedback information. The feedback information generator measures the channel condition for each sub-carrier and transmits the channel condition measurement to the sub-carrier allocator. However, an existing mobile communication system is limited in the data rate at which uplink data is transmitted. Since the uplink is at a low rate, it is impossible to transmit the measured channel condition information to the Node B on the low-rate uplink. Moreover, when the channel environment varies with time as in a mobile communication system, the sub-carrier assignment must be periodic and that is shorter than a coherence time. However, when the feedback information is delivered on a sub-carrier basis as described before, it takes a long time to transmit the feedback information, which makes it impossible to assign sub-carries to the UE periodically. The transmission of feedback information for each sub-carrier seriously reduces available radio resources. Therefore, techniques to solve these problems are studied.

SUMMARY OF THE INVENTION

An object of the present invention is to substantially solve at least the above problems and/or disadvantages and to provide at least the advantages below. Accordingly, an object of the present invention is to provide an apparatus and method for reducing feedback information transmitted on an uplink.

Another object of the present invention is to provide an apparatus and method for assigning different sub-carriers to a user equipment (UE) according to a varying channel condition.

A further object of the present invention is to provide an apparatus and method for prioritizing UEs and assigning sub-carriers to the UEs according to their priority levels when the UEs request sub-carriers.

The above objects are achieved by providing an apparatus and method for assigning sub-carriers in an Orthogonal Frequency Division Multiplex (OFDM) system. According to one aspect of the present invention, in an OFDM system that transmits data through at least one transmit antenna, assigning at least two sub-carriers in a predetermined frequency band to a UE, for data transmission. A Node B groups sub-carriers available to the OFDM system into sub-carrier groups, each having at least two sub-carriers, transmits data to the UE on sub-carriers in the sub-carrier groups, selects at least one sub-carrier group for the UE based on channel condition information about each of the sub-carrier groups received from the UE, and assigns the selected sub-carrier group to the UE.

According to another aspect of the present invention, in an OFDM system that transmits data through at least one transmit antenna, assigning to at least two sub-carriers in a predetermined frequency band from a Node B, for data transmission. A UE receives from the Node B information about sub-carrier groups. The sub-carrier groups are produced by grouping sub-carriers available to the OFDM system, each having at least two sub-carriers. The UE then generates channel condition information about data received on sub-carriers of the sub-carrier groups and produces channel condition information about each of the sub-carrier groups. The UE transmits the channel condition information about the sub-carrier groups to the Node B.

According to a further aspect of the present invention, in an OFDM system that transmits data through at least one transmit antenna, assigning at least two sub-carriers in a predetermined frequency band from a Node B to a UE. The Node B groups sub-carriers available to the OFDM system into sub-carrier groups, each having at least two sub-carriers, transmits data to the UE on sub-carriers in the sub-carrier groups, selects a sub-carrier group for the UE based on channel condition information about each of the sub-carrier groups received from the UE, and assigns the selected sub-carrier group to the UE. The UE generates channel condition information about data received on the sub-carriers of the sub-carrier groups, produces channel condition information about each of the sub-carrier groups, and transmits the channel condition information about the sub-carrier groups to the Node B.

BRIEF DESCRIPTION OF THE DRAWINGS

The above and other objects, features and advantages of the present invention will become more apparent from the following detailed description when taken in conjunction with the accompanying drawings in which.

It should be understood that in the drawings, like reference numbers refer to like features and structures.

DETAILED DESCRIPTION OF THE PREFERRED EMBODIMENTS

Figure 3:
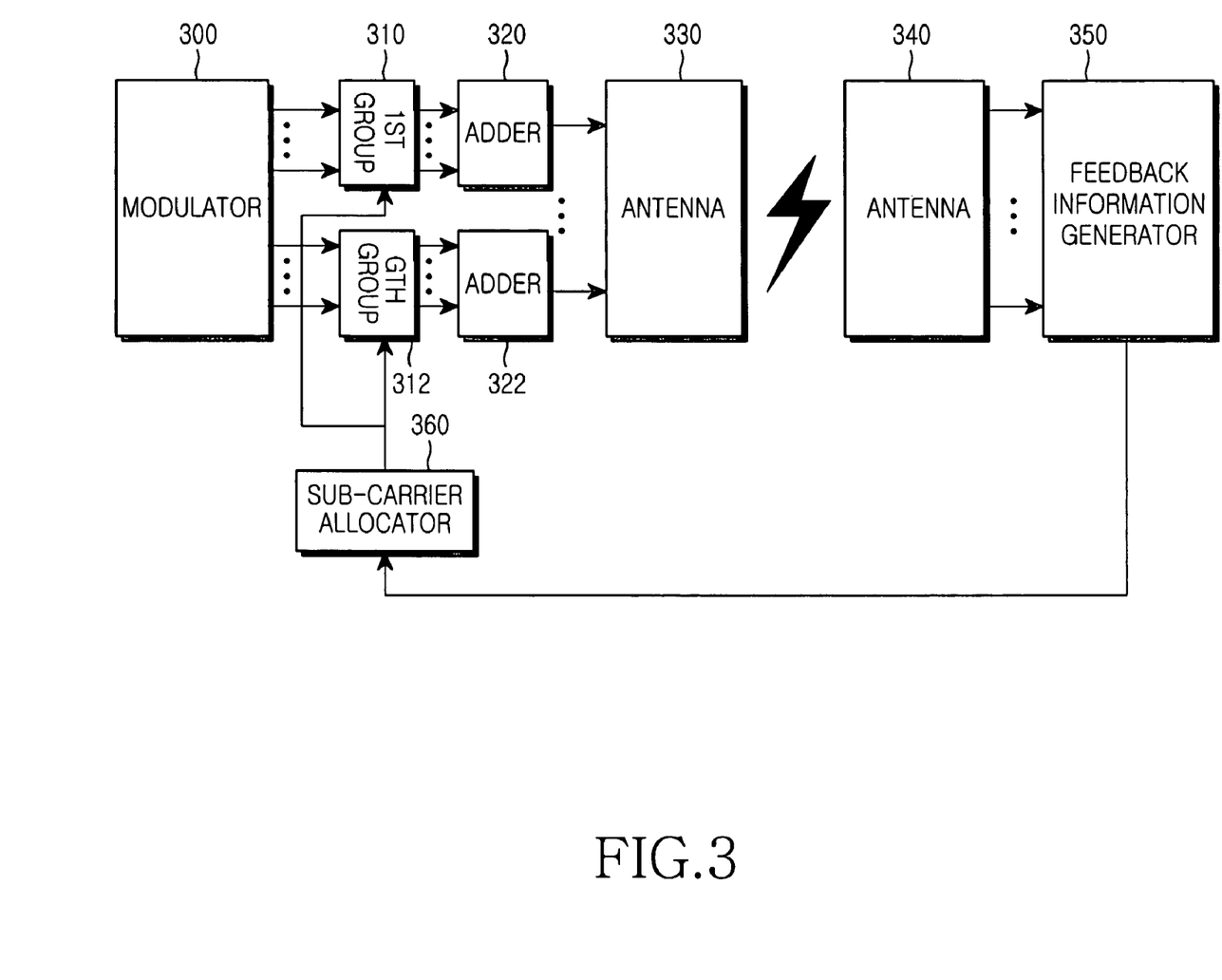
FIG. 3 is a block diagram illustrating an operation for assigning sub-carriers to a UE in a sub-carrier allocator of a Node B in a single-carrier OFDM system according to an embodiment of the present invention.

Embodiments of the present invention will be described with reference to the accompanying drawings. In the following description, well-known functions or constructions are not described in detail FIG. 3 is a block diagram illustrating an operation in a Node B for assigning sub-carriers to a user equipment (UE) in a single-antenna Orthogonal Frequency Division Multiplex (OFDM) system according to an embodiment of the present invention. One or more sub-carrier groups are set, each having a plurality of sub-carriers. The UE transmits feedback information on a per-sub-carrier group basis, not on a per-sub-carrier basis. Hereinafter, the sub-carrier assignment to the UE in the Node B will be described with reference to FIG. 3.

N sub-carriers are available and grouped into G sub-carrier groups in an OFDM mobile communication system. Grouping of the sub-carriers will first be described. The number of sub-carrier groups may vary according to channel conditions. In the case of a channel experiencing serious frequency selective fading, the number of sub-carriers in one group is reduced, whereas in the case of a frequency flat fading channel, one group has more sub-carriers. Also, the data rate of the low-rate uplink may be considered. Therefore, G is determined according to the number of sub-carriers in each group.

Sub-carriers can be selected for a sub-carrier group by Alternative Sub-carrier Allocation(ASA) or Sub-band Sub-carrier Allocation (SSA). For the purpose of illustration, it is assumed that there are sub-carriers #0 to #N+1 and two sub-carrier groups are set.

According to the ASA, even numbered subcarriers (sub-carrier #0, sub-carrier #2, . . . , sub-carrier #N+2) are included in a first group, and odd numbered subcarriers (sub-carrier #1, sub-carrier #3, . . . , sub-carrier #N+1) are included in a second group. On the other hand, the SSA groups sub-carrier #0, sub-carrier #1, . . . , sub-carrier #(N/2−1) in a first group, and sub-carrier #N/2, sub-carrier #(N/2+1), . . . , sub-carrier #N+1 in a second group. It should be appreciated by those skilled in the art that the present invention is not limited to the ASA or SSA methods. Any other suitable method for selection sub-carriers for each sub-carrier group may be used. The Node B selects sub-carriers for each sub-carrier group according to whether the UE requests packet data communication or circuit data communication and according to a desired quality of service (QoS).

Typically, adjacent sub-carriers within the coherence bandwidth of the channel are highly correlated. Therefore, there will not be a significant performance degradation if directly successive sub-carriers are grouped into the same group. Thus, the following description assumes the grouping of directly successive sub-carriers into one group. It should be obvious, however, that many other methods are applicable to the present invention including grouping sub-carriers spaced by a predetermined interval or longer into one group, or cyclically grouping sub-carriers in to every predetermined time periods, and the like. If the grouping method is changed, the Node B notifies the UE of the change in grouping by physical layer signaling or higher-layer signaling. This signaling is beyond the scope of the present invention and thus its detailed description is not provided here. For example, the physical layer signaling may take place on an existing High Speed-Downlink Packet Access (HS-DPA) channel, or a High Speed-Shared Control Channel (HS-SCCH).

For the Node B to assign sub-carriers to the UE, a plurality of groups, a modulator, a plurality of adders, a transmit antenna, a receive antenna, a feedback information generator, and a sub-carrier allocator are provided as illustrated in FIG. 3.

A modulator 300 modulates received signals and transmits the modulated signals to a plurality of groups. The number of the groups is determined according to the number of sub-carriers used and a coherent bandwidth. Each group assigns received modulated signals to sub-carriers. As stated, each group has successive sub-carriers. A first group 310 assigns received modulated signals to the sub-carriers of the first group 310 and transmits them to an adder 320. A $G^{th}$ group 312 assigns received modulated signals to the sub-carriers of the $G^{th}$ group 312 and transmits them to an adder 322. The adder 320 adds the received signals and transmits the sum to a transmit antenna 330, and the adder 322 adds the received signals and transmits the sum to the transmit antenna 330. The transmit antenna 330 transmits the signals to a receive antenna 340 on a radio channel.

The receive antenna 340 transmits the signals received on the sub-carriers to a feedback information generator 350. The feedback information generator 350 sorts the signals by groups. The feedback information generator 350 measures the channel condition of signals received on sub-carriers in each group and transmits the measurement to a sub-carrier allocator 360. The operation of the feedback information generator 350 will be described later in more detail.

The sub-carrier allocator 360 selects a sub-carrier group to be assigned to the UE based on the received channel condition information (i.e. feedback information). A base station (BS) communicates with the UE using the selected sub-carrier group.

Figure 4:
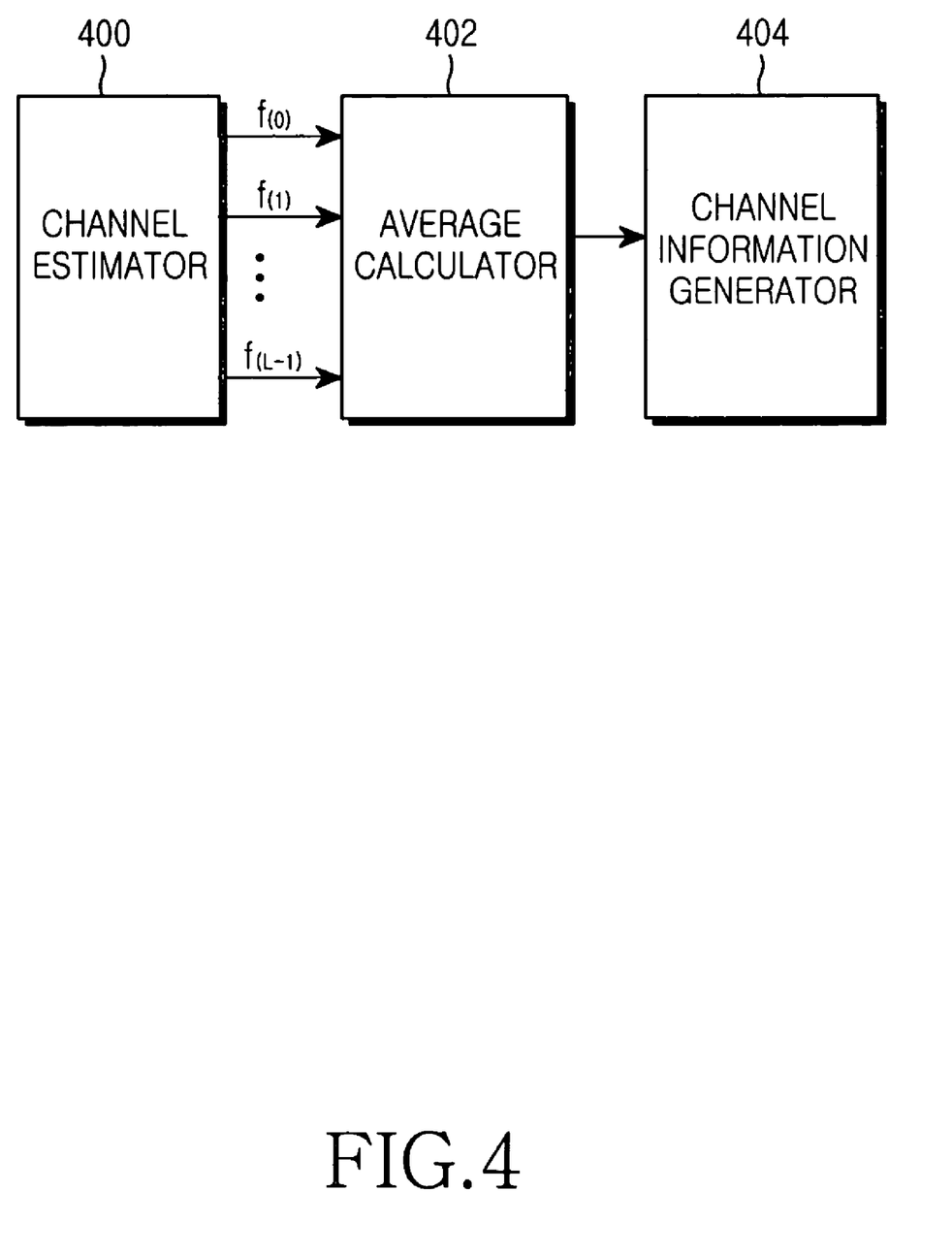
FIG. 4 is a block diagram illustrating a feedback information generator illustrated in FIG. 3.

FIG. 4 is a block diagram of the feedback information generator. With reference to FIG. 4, the operation of the feedback information generator will now be described. The feedback information generator comprises a channel estimator 400, an average calculator 402, and a channel information generator 404.

The channel estimator 400 channel-estimates a received signal. The channel estimation is performed on a sub-carrier basis. As stated before, a Signal to Interference power Ratio (SIR), Signal to Interference plus Noise Ratio (SINR), Bit Error Rate (BER), Frame Error Rate (FER) or Channel-to-Noise Ratio (CNR) is measured as a channel estimate. An exemplary embodiment of the present invention takes the SIR into account. While sub-carriers in one group are used by way of example, the channel estimator 400 can channel-estimate all received sub-carriers.

The average calculator 402 calculates the average of SIRs (channel estimate values) measured for the sub-carriers of a particular group in the channel estimator 400 and outputs the average SIR as a channel estimate value for the group. Receiving channel estimate values for all received sub-carriers, the average calculator 402 sorts the channel estimate values by groups and calculates the average of channel estimate values for each sub-carrier group. The operation of the average calculator 402 is expressed as $$SIR_g = \frac{1}{L} \sum_{f=L(g-1)}^{LG-1} SIR_f \quad (1)$$

where $SIR_g$ is the average of channel estimate values for the sub-carriers of a sub-carrier group, $SIR_f$ is a channel estimate value for a sub-carrier, L is the number of sub-carriers in one group, G is the number of the groups, and f represents a sub-carrier. Upon receipt of channel estimate values for all received sub-carriers, the average calculator 402 computes the average channel estimate value for each group by Eq. (1). The average channel estimate values for the groups are illustrated in Table 2.

TABLE 2

| Group number | Average channel estimate value |
|---|---|
| 1$^{st}$ group | B |
| 2$^{nd}$ group | A |
| 3$^{rd}$ group | E |
| 4$^{th}$ group | C |
| ... | ... |
| G$^{th}$ group | G |

The channel information generator 404 maps the average channel estimate values to predetermined values in a preset rule. An exemplary set of values to which the average channel estimate values are mapped are illustrated in Table 3.

TABLE 3

| Average channel estimate value | Mapping value |
|---|---|
| A and B | 00 |
| C and D | 01 |
| E | 10 |
| F and G | 11 |

The average channel estimate values are mapped to four preset values in Table 3. The range of average channel estimate values mapped to the respective mapping values are adjusted by user selection. Also, although four mapping values are used in Table 3, the average channel estimate values can be mapped to at least two preset values by user selection. However, if the average channel estimate values are classified into too many preset values, more bits are used to identify the present values, thereby increasing the volume of data on the uplink. Therefore, the number of mapping values is determined appropriately by taking the uplink into account.

In accordance with an embodiment of the present invention, the ranges of average channel estimate values mapped to "00" and "11" are relatively wide, including A and B, and F and G, respectively, because the probability of the highest and lowest average channel estimate values is low. Since an intermediate average channel estimate value is highly probable, its range mapped to "10" is relatively narrow, thus including only E. Consequently, the probabilities of the mapping values are approximate. Alternatively, mapping values can be set by comparing the average channel estimate values with no regard to their absolute generation probabilities. For example, given four groups, "00" is assigned to a group having the highest average estimate value, and "01", "10" and "11" are sequentially assigned to the other groups in a descending order of average estimate values. This mapping method is adopted in an exemplary embodiment of the present invention, though many other methods are available.

Table 4 illustrates an example of feedback information that the channel information generator 404 delivers to the sub-carrier allocator.

TABLE 4

| Group number | Feedback information |
|---|---|
| 1$^{st}$ group | 00 |
| 2$^{nd}$ group | 11 |
| 3$^{rd}$ group | 10 |
| 4$^{th}$ group | 01 |
| ... | ... |
| G$^{th}$ group | 11 |

Hereinafter, it is assumed that feedback information is prioritized in the order of 00, 01, 10 and 11. The sub-carrier allocator 360 selects a sub-carrier group to assign to the UE based on the feedback information. If the sub-carrier allocator 360 receives the feedback information illustrated in Table 4 and needs one sub-carrier group, it selects the 1$^{st}$ group (with feedback of "00") and assigns the sub-carriers of the selected sub-carrier group to the UE. If two sub-carriers groups are needed, the sub-carrier allocator 360 assigns the sub-carriers of the first and fourth groups (feedback values of "00" and "01", respectively) to the UE.

Figure 5:
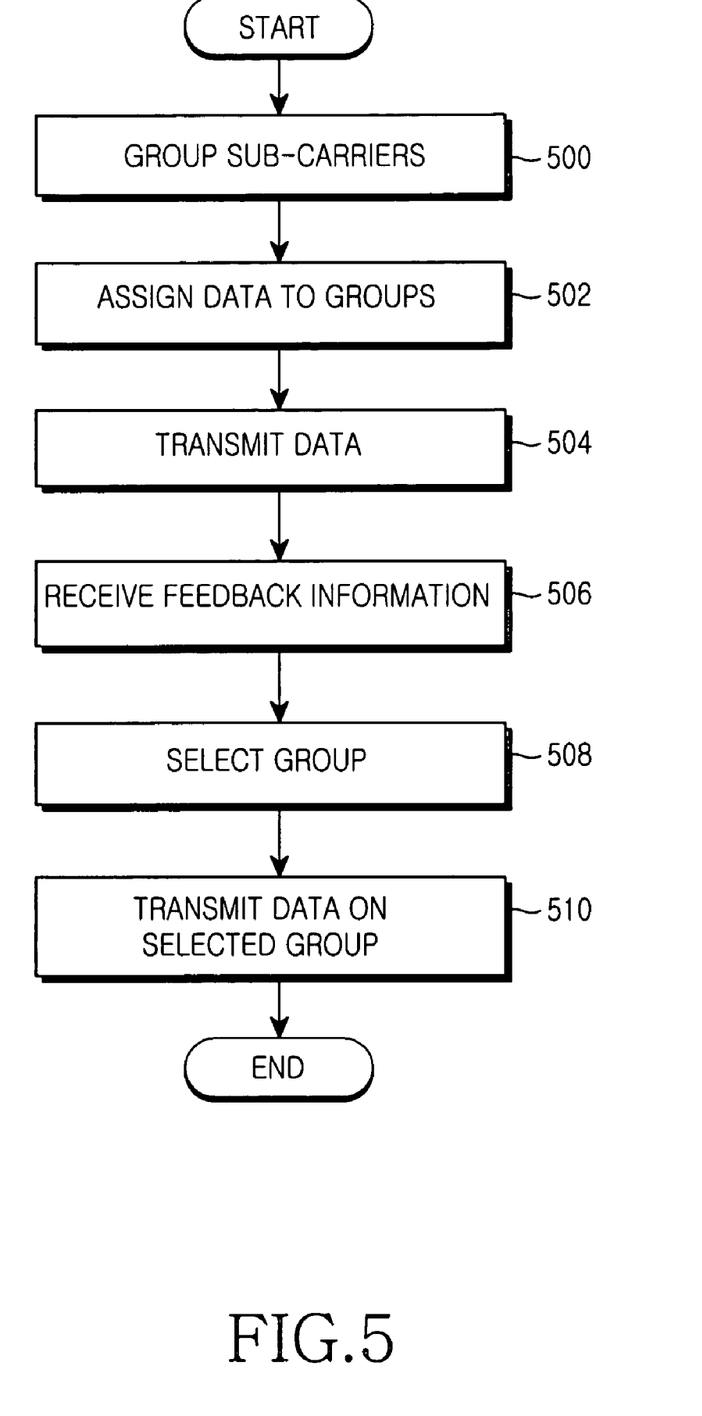
FIG. 5 is a flowchart illustrating a Node B operation according to an embodiment of the present invention.

FIG. 5 is a flowchart illustrating a Node B operation according to an embodiment of the present invention.

Referring to FIG. 5, the Node B groups sub-carriers into a plurality of sub-carrier groups according to the number of the sub-carriers and a coherent bandwidth in step 500. It is assumed that each group has successive sub-carriers. For reference, the sub-carriers of each sub-carrier group can be changed every predetermined time period. Otherwise, the same specific band might be repeatedly assigned to a particular user. For example, if a first sub-carrier group includes sub-carriers #0 to #5 at an initial transmission, it may have sub-carriers #2 to #7 a user-determined time later. Upon another time-out, the first group may have sub-carriers #4 to #9. Accordingly, sub-carriers in the other sub-carrier groups are also changed.

In step 502, the Node B assigns transmission data to the sub-carrier groups, that is, to the sub-carriers of each sub-carrier group. The Node B transmits the data to the UE in step 504.

The Node B waits until feedback information is received in step 506. The feedback information represents the channel condition of each sub-carrier group. The channel condition of each sub-carrier group is the average channel condition values measured for the sub-carriers in the sub-carrier group.

In step 508, the Node B selects a sub-carrier group by which to transmit data to the UE. The Node B arranges the feedback information in an order of good channel condition and selects the sub-carrier group based on the feedback information. The Node B transmits data to the UE on sub-carriers belonging to the selected sub-carrier group in step 510.

Figure 6:
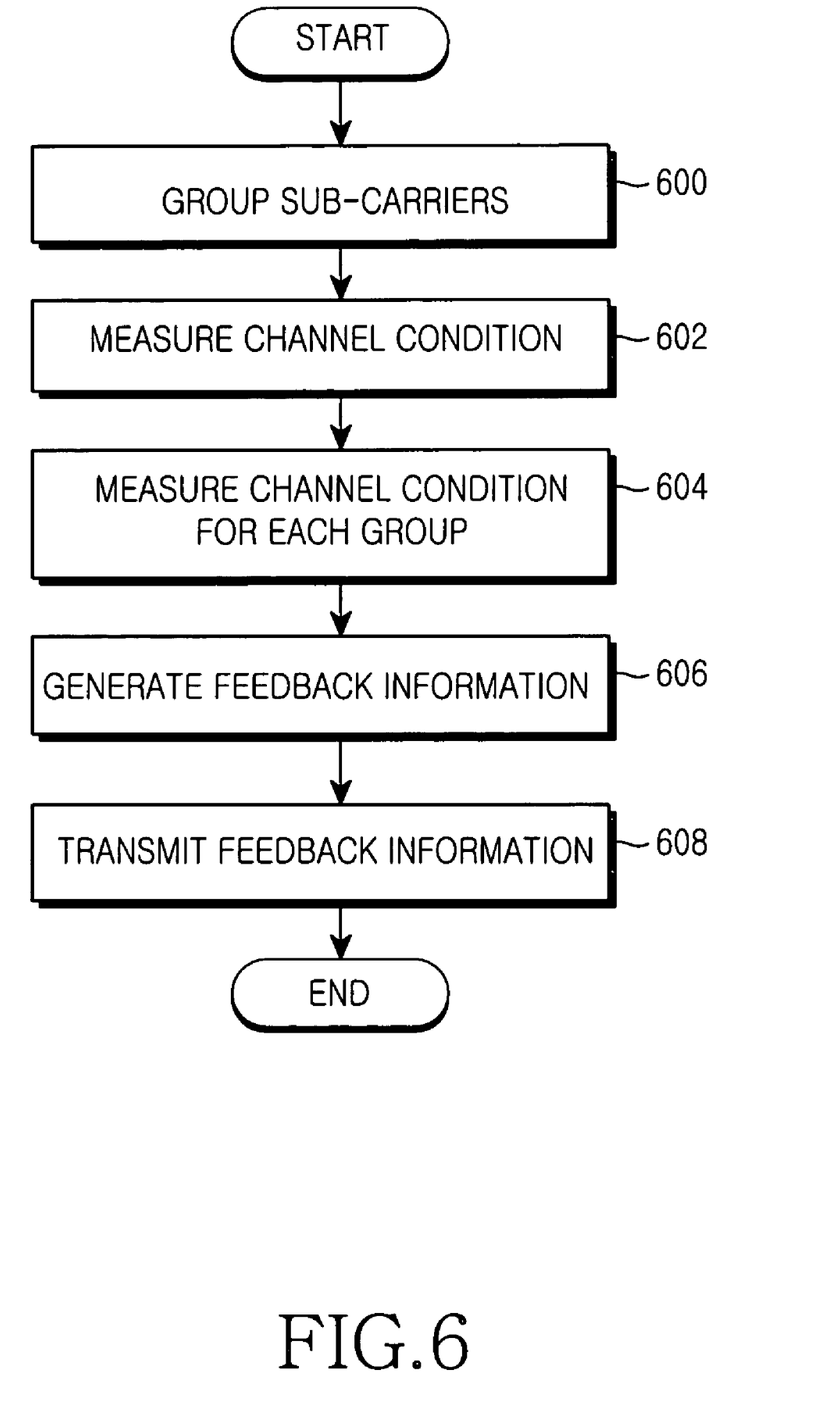
FIG. 6 is a flowchart illustrating a UE operation according to an embodiment of the present invention.

FIG. 6 is a flowchart illustrating a UE operation according to an embodiment of the present invention.

Referring to FIG. 6, in step 600, the UE groups sub-carriers into a plurality of sub-carrier groups in the same manner as step 500 of FIG. 5. Thus, the UE can receive information about the sub-carrier groups set in the Node B on the same channel as or a different channel from the channel on which the data is received.

In step 602, the UE measures the channel conditions (i.e. SNRs or CNRs) of received sub-carriers. The UE calculates the channel condition of each sub-carrier group using the channel condition measurements in step 604. Specifically, the UE sorts the received sub-carriers by groups and calculates the average of the channel condition values of the sub-carriers in each sub-carrier group. This average is the channel condition of the sub-carrier group. Instead of calculating the average of the channel condition values of the sub-carriers in each sub-carrier group, they can be summed.

In step 606, the UE generates feedback information from the channel condition information for each sub-carrier group. If the channel condition information is the sum of channel condition values for the sub-carriers in each sub-carrier group, the feedback information is generated from channel estimate value sums rather than average channel estimate values illustrated in Table 3. Assuming the sub-channels are weighted equally, the same result is achieved whether the averages or the sums are used in generating the feedback information in step 608, although in alternate embodiments, weighted calculations may be used.

Figure 7:
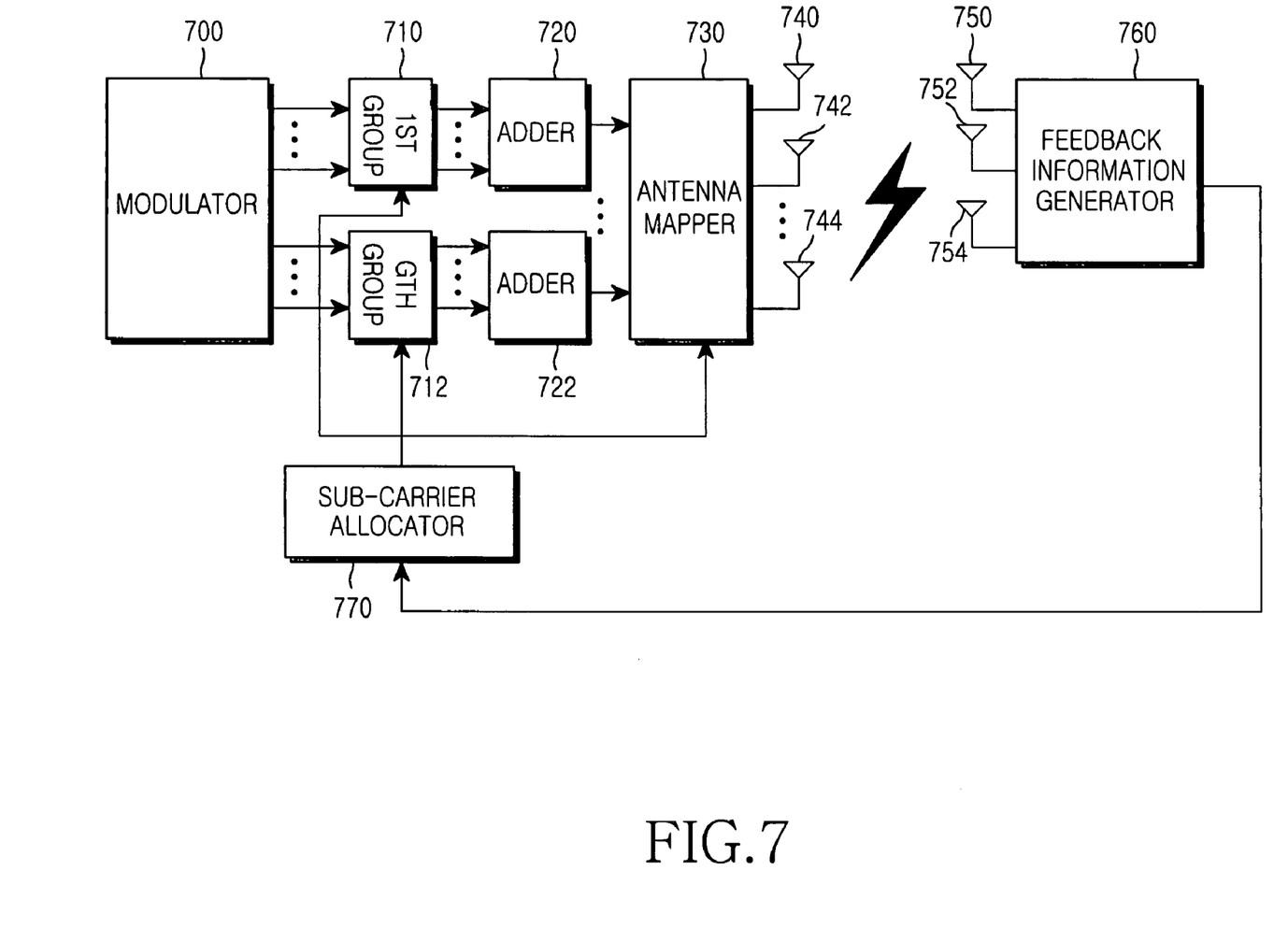
FIG. 7 is a block diagram illustrating an operation for assigning sub-carriers to a UE in the sub-carrier allocator of the Node B in a multi-antenna OFDM system according to an embodiment of the present invention.

A mobile communication system having one transmit antenna and one receive antenna has been described so far. A description will be made of a mobile communication system having a plurality of transmit antennas and a plurality of receive antennas. FIG. 7 is a block diagram of an OFDM mobile communication system using multiple transmit and receive antennas according to an embodiment of the present invention. Each transmit antenna transmits data on a plurality of sub-carriers at a predetermined frequency.

Referring to FIG. 7, for a Node B to assign sub-carriers to a UE, a plurality of groups, a modulator, a plurality of adders, transmit antennas, receive antennas, a feedback information generator, and a sub-carrier allocator are provided.

A modulator 700 modulates received signals and transmits the modulated signals to a plurality of groups. The number of the groups is determined according to the number of sub-carriers used, a coherent bandwidth, and the number of transmit/receive antennas. Each group assigns received modulated signals to sub-carriers. As stated earlier, each group has successive sub-carriers. A first group 710 assigns received modulated signals to the sub-carriers of the first group 710 and transmits them to an adder 720. A $G^{th}$ group 712 assigns received modulated signals to the sub-carriers of the $G^{th}$ group 712 and transmits them to an adder 722. The adder 720 adds the received signals and transmits the sum to an antenna mapper 730, and the adder 722 adds the received signals and transmits the sum to the antenna mapper 730.

The antenna mapper 730 assigns the sub-carrier groups to transmit antennas 740, 742 and 744. The antenna mapper 730 may assign the sub-carriers of a group to one or more transmit antennas. That is, the sub-carriers of the first group 710 are transmitted on at least one of the transmit antennas 740, 742 and 744. It is assumed hereinbelow that the antenna mapper 730 maps the sub-carriers of a group such that the sub-carriers are delivered to a receiver through the transmit antennas 740, 742 and 744.

The sub-carrier groups are transmitted to receive antennas 750, 752 and 754 through the transmit antennas 740, 742 and 744. While the same number of transmit and receive antennas are used in FIG. 7, the number of transmit and receive antennas can be controlled by user selection.

The receive antennas 750, 752 and 754 deliver received sub-carrier groups to a feedback information generator 760.

The feedback information generator 760 generates feedback information for the sub-carrier groups in the same manner as the feedback information generator 350 illustrated in FIG. 3. Yet, the feedback information generator 760 generates more feedback information than the counterpart 350 and that of the respective transmit antennas 740, 742 and 744. Table 5 illustrates an example of the feedback information generated in the feedback information generator 760.

TABLE 5

|  | $1^{st}$ group | $2^{nd}$ group | ... | $G^{th}$ group |
|---|---|---|---|---|
| Transmit antenna 740 | 00 | 01 | ... | 11 |
| Transmit antenna 742 | 01 | 10 | ... | 01 |
| ... | ... | ... | ... | ... |
| Transmit antenna 744 | 01 | 10 | ... | 00 |

The feedback information generator 760 generates the feedback information for each group and for transmit antenna as illustrated in Table 5 and transmits the feedback information to a sub-carrier allocator 770. The sub-carrier allocator 770 selects a sub-carrier group and a transmit antenna for a particular UE and controls the first to $G^{th}$ groups 710 to 712 and the antenna mapper 730 based on the selection information.

Table 6 lists feedback information for each transmit antenna and for each UE for sub-carrier assignment in the sub-carrier allocator 770. For convenience, an OFDM system having two transmit antennas and two UEs is assumed to be used. The sub-carrier allocator 770, receiving the feedback information illustrated in Table 5 from two UEs each having two antennas, arranges the feedback information as illustrated in Table 6.

TABLE 6

|  | $1^{st}$ group | $2^{nd}$ group | ... | $G^{th}$ group |
|---|---|---|---|---|
| $1^{st}$ transmit antenna, UE1 | 00 | 01 | ... | 11 |
| $1^{st}$ transmit antenna, UE2 | 01 | 00 | ... | 01 |
| $2^{nd}$ transmit antenna, UE1 | 11 | 11 | ... | 10 |
| $2^{nd}$ transmit antenna, UE2 | 01 | 10 | ... | 00 |

As noted in Table 6, UE 1 has the best channel condition when data is transmitted on the sub-carriers of the first group through the first transmit antenna, while UE 2 has the best channel condition when data is transmitted on the sub-carriers of the second group through the first transmit antenna, or when data is transmitted on the sub-carriers of the $G^{th}$ group through the second transmit antenna. Therefore, the sub-carrier allocator 770 controls data to be transmitted to UE1 on the sub-carrier of the first group through the first transmit antenna, and to UE2 on the sub-carriers of the $G^{th}$ group through the second transmit antenna.

If a plurality of transmit antennas and a plurality of sub-carrier groups offer a good channel condition to a UE, they are prioritized according to a requested QoS and the type of a requested service. For example, when UE 1 requests packet data and UE 2 requests circuit data and the UEs are at the best channel condition for the same transmit antenna and sub-carrier group, the sub-carrier allocator 770 gives priority to UE 1 requesting packet data over UE 2 requesting circuit data. Yet, sub-carrier assignment criteria are implementation-dependent.

Figure 8:
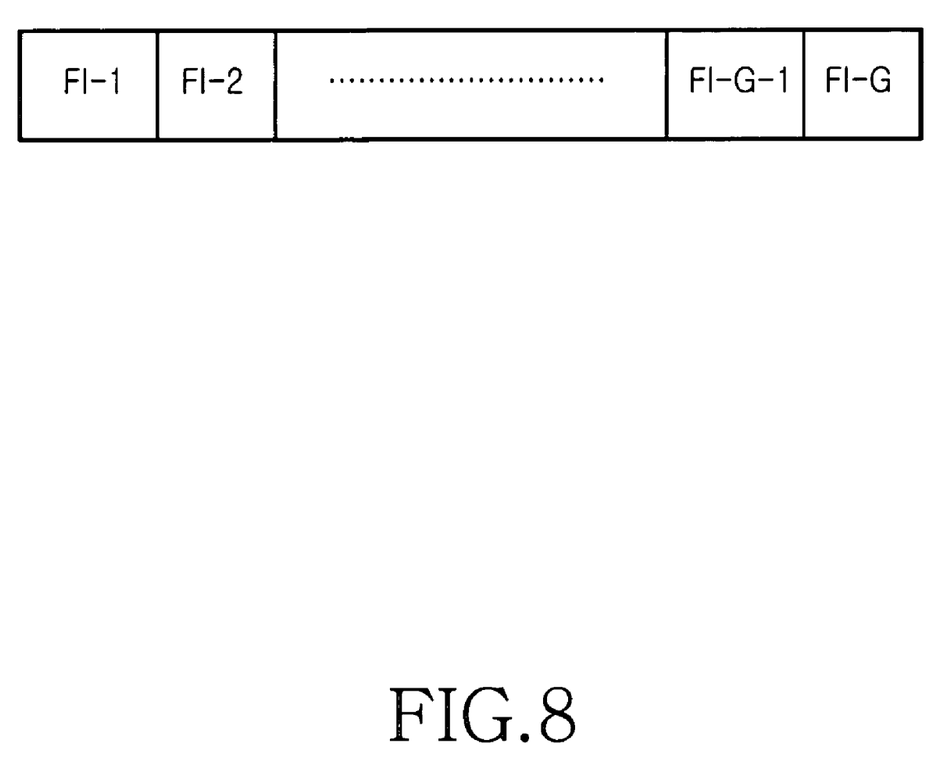
FIG. 8 is a block diagram illustrating the format of feedback information generated at the UE and transmitted to the Node B in the multi-antenna OFDM system according to an second embodiment of the present invention.

FIG. 8 illustrates the format of feedback information transmitted from a UE to a Node B in the multi-antenna system according to an embodiment of the present invention. Since the UE and the Node B are aware of the grouping of the sub-carriers, the UE transmits feedback information indexes for the first group to the $G^{th}$ group without any particular indexes for the groups and the Node B assigns a sub-carrier group to the UE based on the received information. The feedback information may be transmitted on the HS-DPCCH for HS-DPA, for example.

As described, the present invention effects single or multi-antenna select diversity in OFDM. Also, transmission of uplink feedback information on a per-sub-carrier group basis leads to efficient use of radio resources.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A method in a Node B for transmitting data to a user equipment (UE) in an orthogonal frequency division multiplex (OFDM) system that transmits data through at least one transmit antenna, for data transmission, the method comprising the steps of:

receiving channel condition information about each of sub-carrier groups for each transmit antenna of the Node B from the UE;

preferentially selecting sub-carrier groups for the UE, which are to be used for transmission of the data based on the channel condition information and preferentially selecting a transmit antenna for transmission of the data in a descending order of channel conditions based on the channel condition information; and transmitting the data, information about the selected sub-carrier groups, through the selected transmit antenna, wherein the sub-carrier groups for transmission of the data comprise adjacent sub-carriers, the channel condition information is a ranked preset value representing channel conditions of sub-carriers of the sub-carrier groups, and each of the sub-carrier groups has more sub-carriers in a case of a frequency flat fading channel; wherein the selecting step further comprises the step of:

assigning the sub-carrier group to the UE according to quality of service and the type of a service requested by the UE if the Node B receives channel condition information about the sub-carrier groups from at least two UEs; and further comprising the step of:

selecting a transmit antenna for the UE according to the channel condition information about the sub-carrier groups if at least two transmit antennas are used.

2. The method of claim 1, wherein the sub-carriers of the sub-carrier groups are changed every predetermined time period.

3. The method of claim 1, wherein the channel condition information about each of the sub-carrier groups comprises an average of the signal-to-noise ratios (SNRs) of sub-carriers included in the sub-carrier group.

4. An apparatus of a Node B for transmitting data to a user equipment (UE) in an orthogonal frequency division multiplex (OFDM) system that transmits data through at least one transmit antenna, comprising:

a modulator for modulating the data;

a controller for receiving channel condition information about each of sub-carrier groups for each of the transmit antennas of the Node B from the UE, preferentially selecting sub-carrier groups for the UE, which are to be used for transmission of the data in a descending order of a condition of the channel based on the channel condition information and preferentially selecting transmit antenna for transmission of the data in the descending order of a condition of the channel based on the channel condition information;

a signal processor for mapping the data to the selected sub-carrier groups under control of the controller; and a transmitter for assigning the data mapped to the selected sub-carrier groups to the selected transmit antenna under control of the controller and transmitting the data, and information about the selected sub-carrier groups to the UE through a plurality of transmit antennas, wherein the selected sub-carrier groups for transmission of the data comprise adjacent sub-carriers and the channel condition information is a ranked preset value representing channel conditions of sub-carriers of the sub-carrier groups, and each of the sub-carrier groups has more sub-carriers in a case of a frequency flat fading channel;

wherein if the Node B receives the channel condition information about the sub-carrier groups from at least two UEs, the Node B assigns the sub-carrier group to the UE according to a quality of service and a type of service requested by the UE, and wherein, if at least two transmit antennas are used, the Node B selects a transmit antenna for the UE according to the channel condition information about the sub-carrier groups.

5. The apparatus of claim 4, wherein the Node B changes the sub-carriers of the sub-carrier groups every predetermined time period.

6. The apparatus of claim 4, wherein the UE measures a signal-to-noise ratio (SNR) of the received data as the channel condition information.

7. The apparatus of claim 6, wherein the UE calculates the average of the SNRs of sub-carriers included in each of the sub-carrier groups as the channel condition information about the sub-carrier group.

8. The apparatus of claim 6, wherein the UE calculates the sum of the SNRs of sub-carriers included in each of the sub-carrier groups as the channel condition information about the sub-carrier group.

9. The apparatus of claim 7, wherein, if the UE receives the data on the sub-carriers from at least two transmit antennas, the UE generates the channel condition information about each of the sub-carrier groups for each of the transmit antennas.

* * * * *